United States Patent
Ranalli et al.

(10) Patent No.: US 10,160,365 B2
(45) Date of Patent: Dec. 25, 2018

(54) BEVERAGE HOLDER FOR VEHICLES

(71) Applicants: GENTHERM GMBH, Odelzhausen (DE); AUDI AG, Ingolstadt (DE)

(72) Inventors: Marco Ranalli, Augsburg (DE); Martin Adldinger, Holzheim (DE); Jörg Leder, Kösching (DE)

(73) Assignees: GENTHERM GMBH, Odelzhausen (DE); AUDI AG, Ingolstadt (DE)

( * ) Notice: Subject to any disclaimer, the term of this patent is extended or adjusted under 35 U.S.C. 154(b) by 110 days.

(21) Appl. No.: 14/894,655

(22) PCT Filed: Jun. 6, 2014

(86) PCT No.: PCT/DE2014/000281
§ 371 (c)(1),
(2) Date: Nov. 30, 2015

(87) PCT Pub. No.: WO2014/194879
PCT Pub. Date: Dec. 11, 2014

(65) Prior Publication Data
US 2016/0107558 A1    Apr. 21, 2016

(30) Foreign Application Priority Data
Jun. 6, 2013   (DE) .................... 10 2013 009 473

(51) Int. Cl.
*F25B 21/02*   (2006.01)
*B60N 3/10*    (2006.01)

(52) U.S. Cl.
CPC ............. *B60N 3/104* (2013.01); *B60N 3/101* (2013.01)

(58) Field of Classification Search
CPC ....... B60N 3/104; B60N 3/101; F25D 31/007; F25D 31/006; F25D 2303/083; F25D 2331/803
See application file for complete search history.

(56) References Cited

U.S. PATENT DOCUMENTS 2,046,125 A    7/1936   Lacy
3,432,641 A    3/1969   Welke
(Continued)

FOREIGN PATENT DOCUMENTS

DE        3639089 A1  *  5/1988  ......... B60H 1/00478
DE  102009004591 A1  *  7/2010  ............. F25D 21/14
(Continued)

OTHER PUBLICATIONS

International Search Report for Application No. PCT/DE2014/000281 dated Nov. 6, 2014.

*Primary Examiner* — Kamran Tavakoldavani
(74) *Attorney, Agent, or Firm* — The Dobrusin Law Firm, PC

(57) ABSTRACT

The invention relates to a temperature-controlled beverage holder (0) for vehicles for holding a beverage container (1), comprising, at least one temperature-control device (3) for controlling the temperature of the beverage container (1) at least one temperature-control fluid circuit (2) for controlling the temperature of the temperature-control device (3) by means of a temperature-control fluid, at least one first heat transfer device (21) for transferring heat flow between the temperature-control device (3) and the temperature-control fluid circuit (2), and at least one temporary fluid reservoir (23) for temporarily storing the temperature-control fluid. According to the invention, the first heat transfer device (21) and the temporary fluid reservoir (23) are arranged directly adjacent to one another or are produced from one piece.

16 Claims, 1 Drawing Sheet

(56) References Cited

U.S. PATENT DOCUMENTS

| | | | |
|---|---|---|---|
| 4,095,090 A | 7/1978 | Pianezza | |
| 4,463,664 A | 8/1984 | Peace | |
| 4,801,782 A | 1/1989 | Ineson | |
| 4,842,353 A | 6/1989 | Thevenon | |
| 5,243,684 A | 9/1993 | Edwards | |
| 5,283,420 A | 2/1994 | Montalto | |
| 5,508,494 A | 4/1996 | Sarris et al. | |
| 5,842,353 A | 12/1998 | Kuo-Liang | |
| 6,013,901 A | 1/2000 | Lavoie | |
| 6,075,229 A | 6/2000 | Vanselow | |
| 6,082,114 A | 7/2000 | Leonoff | |
| 6,119,461 A | 9/2000 | Stevicl et al. | |
| 6,121,585 A | 9/2000 | Dam | |
| 6,140,614 A | 10/2000 | Padamsee | |
| 6,155,063 A * | 12/2000 | Felde | A47J 31/005 296/37.12 |
| 6,272,867 B1 * | 8/2001 | Barrash | F25B 9/14 62/6 |
| 6,530,232 B1 * | 3/2003 | Kitchens | F25D 31/007 62/3.2 |
| 6,670,583 B2 | 12/2003 | Kara | |
| 6,725,670 B2 * | 4/2004 | Smith | F02G 1/0435 60/520 |
| 6,864,462 B2 | 3/2005 | Sanoner et al. | |
| 6,870,135 B2 | 3/2005 | Hamm et al. | |
| 7,804,045 B2 | 9/2010 | Rosenbloom et al. | |
| 9,630,543 B2 | 4/2017 | Oh et al. | |
| 2002/0023912 A1 | 2/2002 | McGee et al. | |
| 2002/0175158 A1 | 11/2002 | Sanoner et al. | |
| 2004/0045973 A1 | 3/2004 | Stokes | |
| 2005/0045615 A1 | 3/2005 | Sanoner et al. | |
| 2006/0053805 A1 * | 3/2006 | Flinner | F25B 21/04 62/3.2 |
| 2006/0186297 A1 | 8/2006 | Lore | |
| 2007/0090256 A1 | 4/2007 | Hansen et al. | |
| 2007/0204629 A1 | 9/2007 | Lofy | |
| 2008/0034730 A1 * | 2/2008 | Filippone | F02C 6/00 60/39.182 |
| 2010/0089901 A1 | 4/2010 | Montana | |
| 2011/0022047 A1 * | 1/2011 | Buysse | G05D 23/19 606/45 |
| 2011/0252813 A1 * | 10/2011 | Veltrop | A47J 36/2483 62/3.3 |
| 2014/0352326 A1 | 12/2014 | Oh et al. | |
| 2015/0107271 A1 | 4/2015 | Oh et al. | |
| 2015/0175046 A1 | 6/2015 | Oh et al. | |

FOREIGN PATENT DOCUMENTS

| | | |
|---|---|---|
| DE | 102014111541 A1 | 6/2015 |
| EP | 2532541 A1 | 12/2012 |
| GB | 2335307 A | 9/1999 |
| WO | 02/00458 A2 | 1/2002 |
| WO | 02/20292 | 3/2002 |
| WO | 2003/062720 A2 | 7/2003 |
| WO | 2004/059223 | 7/2004 |
| WO | 2007/089789 | 8/2007 |

* cited by examiner

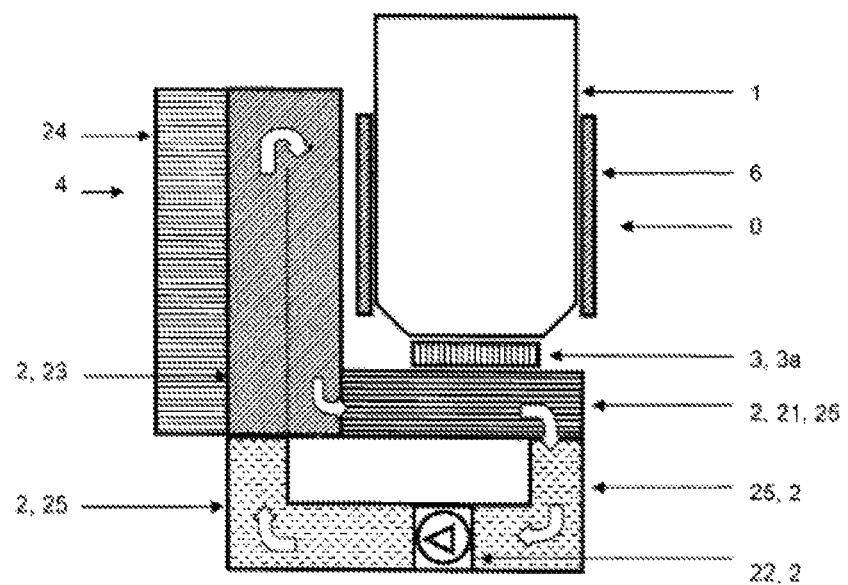

BEVERAGE HOLDER FOR VEHICLES

BACKGROUND OF THE INVENTION

The present invention has as subject matter a beverage holder for vehicles according to the generic part of claim 1.

PRIOR ART

Beverage holders are known in which a held container is temperature-controlled. However, generic beverage holders can be further improved, as regards their cost and their efficiency.

SUBJECT MATTER OF THE INVENTION

Given this background, a technical concept with the features of claim 1 is suggested. Other advantageous embodiments can be gathered from the other claims and the following description.

A temperature-controlled beverage holder for vehicles for holding a beverage holder with at least one temperature-control device for controlling the temperature of the beverage holder, at least one temperature-control fluid circuit for controlling the temperature of the temperature-control device by a temperature-control fluid, and with at least one first thermal transfer device for transforming heat flows between the temperature-control device and the temperature-control fluid circuit is advantageous if it is provided with at least one temporary fluid reservoir for the temporary storing of the temperature-control fluid because it makes possible a rapid temperature control of the beverage container by the increased capacity of maintaining the stored amount of temperature-control fluid, at a certain temperature level.

If the temperature-control element comprises a Peltier element or if the temperature-control element is formed from one or more Peltier elements, it can be used for heating as well as for cooling.

If a beverage holder comprises a second heat transfer device in order to transfer heat between the temperature-control fluid circuit and the environment, this facilitates the heat exchange with the environment in constant operation. If the second heat transfer device is arranged at least partially on or in the temporary fluid reservoir, this improves the thermal transfer because an efficient thermal transfer is improved by slow flow rates. And the flow rate is slower in the temporary fluid reservoir on account of its wider cross section of flow than at most or all other positions of the fluid circuit. In addition, a combining of functions in one structural part reduces the number of structural parts.

A circuit of temperature-control fluid operates more efficiently if at least one pump is provided. The pump is preferably encapsulated with a pump capsule in a sound-absorbing manner since the beverage holder is arranged inside a passenger compartment. If the pump is integrated into the temporary fluid reservoir it requires less space and its oscillations are dampened by the fluid. This is especially true if the pump or the pump capsule is moistened or flowed around at least partially on its outside by temperature-control fluid.

If the first and the second heat transfer devices can be combined or produced from one piece together with the temporary fluid reservoir directly adjacent to each other no connection hoses are necessary. This saves parts and facilitates the assembly. Directly adjacent to each other means that the components either directly contact each other or are arranged in close proximity to each other, wherein, e.g. sealing rings or foam layers for damping vibrations can be placed between them. What is decisive is the significant shortening or avoidance of hoses and tubes.

If at least one of the components of the beverage container is produced from heat-conductive plastic, heavy and expensive metallic parts can be eliminated for them. In addition, these components can then be readily combined with each other as injection-molded parts and produced in one casting.

FIGURE

Details of the invention are explained in the following description and the claims. These explanations are intended to render the invention understandable. However, they only have an exemplary nature.

Reference is made in the following to:

FIG. 1 beverage container in cross section

DESCRIPTION OF THE INVENTION

FIG. 1 shows a beverage container 0 fur holding and temperature-controlling a beverage container 1.

The beverage container 0 preferably comprises at least one temperature-control device 3. Temperature-control device designates a device that serves to control the temperature of the beverage container, e.g., a heat pump, preferably in the form of at least one Peltier element 3a. Its first side is preferably thermally coupled to the beverage container 1 and a second side is preferably thermally connected to a fluid circuit 2.

The beverage container 0 preferably comprises at least one fluid circuit 2 via which heat is transported by a temperature-controlling fluid from the air of the environment 4 to the beverage container 1 or from it back. The fluid circuit 2 is preferably a closed system to which in normal operation temperature-control fluid is neither supplied nor removed from.

The temperature-control fluid preferably consists at least partially of water or some other substance that is liquid at normal pressure and usual temperatures when being used such as oil or saline solution. The high thermal capacity of such materials favors the efficiency of the heat exchange.

The beverage holder preferably comprises at least one pump 22 with a sound-absorbing pump capsule for pumping the temperature-control fluid softly through the fluid circuit 2.

The beverage holder 0 preferably comprises at least one temporary fluid reservoir 23 in order to make available a larger store of suitably temperature-control fluid. Alternatively or additionally temperature-control fluid with an unsuitable temperature can also be temporarily stored and be given time in this manner for temperature adaptation. Its holding capacity is preferably at least ¼ of the total inside volume of the fluid circuit, preferably at least ⅓ and preferably at least one half.

The beverage holder 0 preferably comprises at least one heat transfer device 21. Heat can be withdrawn from the temperature-control device 3 in the first heat transfer device 21 in order, e.g. to remove its waste heat via the fluid circuit 2 in the summer. However, heat can also be taken there from the fluid circuit in order to supply it in the winter to the temperature-control device.

The beverage holder 0 preferably comprises at least one second heat transfer device 24 via which the fluid circuit 2 can exchange heat with the air of the environment 4. This second heat transfer device 24 is preferably housed in a position in the vehicle that is cooler, shaded or at a distance from persons.

A plurality of heat conductor ribs is preferably provided on the second heat transfer device 24 in order to ensure a sufficient heat exchange between the environment 4 and the temperature-control fluid. A number of at least 4, better 10 is advantageous for them. In order to achieve sufficiently large heat flows, these ribs require a sufficient rib height in order to make a large surface available. The height of the ribs is preferably at least 0.5 cm, better at least 1 cm. The heat conductor ribs 24 are preferably arranged directly on the temporary fluid reservoir 23 and preferably connected to it with both consisting of the same substance, and being manufactured at least partially from one piece with it.

LIST OF REFERENCE NUMERALS

0 beverage holder
1 beverage container
2 temperature-control fluid circuit
3 temperature-control device
3a Peltier element
4 environment
6 container holding device
21 first heat transfer device
22 pump
23 temporary fluid reservoir
24 second heat transfer device
25 fluid line

The invention claimed is:

1. A temperature-controlled beverage holder for vehicles for holding a beverage container comprising:
    at least one temperature-control device for controlling a temperature of the beverage container;
    at least one temperature-control fluid circuit for controlling a temperature of the at least one temperature-control device with a temperature-control fluid, the temperature-control fluid being a liquid;
    at least one first heat transfer device for transferring heat flows between the at least one temperature-control device and the at least one temperature-control fluid circuit;
    at least one temporary fluid reservoir for temporarily storing the temperature-control fluid having a cross section wider than a cross section of the at least one temperature-control fluid circuit;
    a second heat transfer device extending along a length of the at least one temporary fluid reservoir substantially parallel to a flow direction of the temperature-control fluid, the second heat transfer device configured to transfer heat flow between the at least one temperature-control fluid circuit and an environment; and
    a pump integrated in the at least one temporary fluid reservoir, the pump being moistened of flowed around at least partially on an outside of the pump by the temperature-control fluid,
    wherein the at least one first heat transfer device and the at least one temporary fluid reservoir directly contact one another.

2. The beverage holder according to claim 1, wherein the at least one temperature-control device comprises at least one Peltier element.

3. The beverage holder according to claim 1, wherein the at least one temperature-control fluid circuit comprises at least one sound-absorbing, encapsulated pump.

4. The beverage holder according to claim 1, wherein the at least one first heat transfer device, the at least one temporary fluid reservoir, and the second heat transfer device of the beverage holder are produced from thermally conductive plastic.

5. The beverage holder according to claim 1, wherein the at least one temporary fluid reservoir has a holding capacity of at least 50% of a total volume of the at least one temperature-control fluid circuit.

6. The beverage holder according to claim 1, wherein the second heat transfer device comprises a plurality of heat conductor ribs.

7. The beverage holder according to claim 1, wherein the at least one first heat transfer device and the at least one temporary fluid reservoir are free of hose connections.

8. The beverage holder according to claim 1, wherein the at least one temperature-control fluid circuit is a closed system.

9. The beverage holder according to claim 1, wherein the at least one first heat transfer device, the at least one temporary fluid reservoir, and the second heat transfer device are all produced from a single piece.

10. The beverage holder according to claim 1, wherein the at least one temporary fluid reservoir includes an internal partition wall that is free of contact with the at least one first heat transfer device and the second heat transfer device and is configured to direct the flow direction of the temperature-control fluid.

11. The beverage holder according to claim 1, wherein the temperature-control fluid enters the at least one temporary fluid reservoir in a direction substantially perpendicular to a direction of the temperature-control fluid when exiting the at least one temporary fluid reservoir.

12. The beverage holder according to claim 2, wherein at least one of the at least one first heat transfer device, the at least one temporary fluid reservoir, and the second heat transfer device of the beverage holder is produced from thermally conductive plastic.

13. The beverage holder according to claim 3, wherein at least one of the at least one first heat transfer device, the at least one temporary fluid reservoir, and the second heat transfer device of the beverage holder is produced from thermally conductive plastic.

14. The beverage holder according to claim 5, wherein at least one of the at least one first heat transfer device, the at least one temporary fluid reservoir, and the second heat transfer device of the beverage holder is produced from thermally conductive plastic.

15. The beverage holder according to claim 6, wherein the ribs have a height of at least 1 cm.

16. The beverage holder according to claim 6, wherein the plurality of heat conductor ribs run substantially perpendicular to a flow path of the temperature-control fluid within the at least one temporary fluid reservoir.

* * * * *